(12) United States Patent
Fuller

(10) Patent No.: US 12,333,745 B2
(45) Date of Patent: Jun. 17, 2025

(54) POTENTIALLY OCCLUDED RASTERIZATION

(71) Applicant: Microsoft Technology Licensing, LLC, Redmond, WA (US)

(72) Inventor: Martin Jon Irwin Fuller, Warwick (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 461 days.

(21) Appl. No.: 17/748,952

(22) Filed: May 19, 2022

(65) Prior Publication Data

US 2023/0377178 A1 Nov. 23, 2023

(51) Int. Cl.
| | |
|---|---|
| *G06T 7/50* | (2017.01) |
| *G06T 1/20* | (2006.01) |
| *G06T 15/00* | (2011.01) |
| *G06T 15/80* | (2011.01) |
| *G06T 17/10* | (2006.01) |

(52) U.S. Cl.
CPC .............. *G06T 7/50* (2017.01); *G06T 1/20* (2013.01); *G06T 15/005* (2013.01); *G06T 15/80* (2013.01); *G06T 17/10* (2013.01)

(58) Field of Classification Search
CPC ........... G06T 1/20; G06T 15/005; G06T 7/50; G06T 15/80; G06T 17/10; G06K 15/1836
See application file for complete search history.

(56) References Cited

U.S. PATENT DOCUMENTS

| | | | |
|---|---|---|---|
| 6,480,205 B1 * | 11/2002 | Greene | G06T 15/405 |
| | | | 345/631 |
| 8,692,844 B1 * | 4/2014 | Molnar | G06T 11/203 |
| | | | 345/614 |
| 2019/0005714 A1 * | 1/2019 | Fuller | G06T 15/005 |

(Continued)

FOREIGN PATENT DOCUMENTS

WO WO-2017164924 A1 * 9/2017 ............. G06F 13/16

OTHER PUBLICATIONS

NVIDIA Corporation; GPU Gems: Chapter 29, Efficient Occlusion Culling (Year: 2004).*

(Continued)

*Primary Examiner* — Gregory A Morse
*Assistant Examiner* — Ty Mitchell Beatty
(74) *Attorney, Agent, or Firm* — ArentFox Schiff LLP

(57) ABSTRACT

Examples described herein relate to rendering an image using a reduced fidelity of shading for portions of a triangle that are potentially occluded by other objects. A computer device may pre-populate a potentially occluded depth map in a graphics processing unit (GPU) for a current frame based on depth data of a previous frame, a low resolution depth pre-pass, or a rasterizing occlusion geometry. The GPU may determine, at a rasterization stage, that a depth of a portion of a triangle being processed is further than a depth of a corresponding tile in the potentially occluded depth map. The GPU may decrease a fidelity of shading applied to at least the portion of the triangle in comparison to a specified fidelity for the triangle in response to determining that the depth of the portion of the triangle is further than the depth of the corresponding tile.

21 Claims, 5 Drawing Sheets

(56) References Cited

U.S. PATENT DOCUMENTS

2019/0362533 A1\* 11/2019 Fuller ................. G06T 15/40
2020/0051290 A1\* 2/2020 Yang ................. G06T 13/80

OTHER PUBLICATIONS

Variable Rate Shading and Depth of Field; Copyright 2012-2020 Intel Corporation (Year: 2020).\*
VRWorks—Variable Rate Shading (VRS) by NVIDIA Corporation (Year: 2019).\*
Get Started with Variable Rate Shading on IntelÂ® Processor Graphics By Adam T Lake, Laura Wieme Reznikov, Marissa du Bois (Year: 2019).\*
"International Search Report and Written Opinion issued in PCT Application No. PCT/US23/019017", Mailed Date: Aug. 11, 2023, 13 Pages.
Zhang, et al., "PowerNet: Learning-Based Real-Time Power-Budget Rendering", in Proceedings of IEEE Transactions on Visualization and Computer Graphics, vol. 28, Issue 10, Mar. 8, 2021, pp. 3486-3498.

\* cited by examiner

POTENTIALLY OCCLUDED RASTERIZATION

BACKGROUND

The present disclosure relates to a computer graphics system, and more particularly, to rendering images including objects at different depths.

A computer graphics system may render an image based on multiple objects from a perspective of a camera. As in the real world, when virtual objects are viewed from a particular perspective, other objects may block (or occlude) the view of all or a portion of the object. Generally, a closer object will occlude a more distant object. In a computer graphics system, overdraw occurs when a closer object is drawn using pixels that already include another object. The existing pixels are replaced with pixels for the closer object. Generally, overdrawing is considered wasteful because the properties of each overdrawn pixel are determined multiple times, using additional processing resources.

One solution to reduce or eliminate overdraw is the use of a depth pre-pass, which is available on modern graphics processing units (GPU). In this scheme each object is rendered twice. In the first iteration, only the per-pixel nearest depth is recorded to the depth buffer. In the second iteration, only the nearest object will pass the depth buffer test and write pixel data. This avoids overdraw, but at the expense of processing every object twice. This expense can sometimes outweigh the benefit of eliminating overdraw resulting in a net loss.

Another solution to reducing overdraw is to perform a low resolution occlusion render, typically using the central processing unit (CPU). Low resolution occlusion geometry is rendered to an occlusion buffer, for example, a box for a building or rectangles for a wall or fence. This occlusion render is used to test a single bounding volume for each object, typically a box. If the entire bounding box is occluded, the software may prevent rendering of the object. Often, however, objects may be only partially occluded, so software occlusion render may still render the entire object, resulting in rendering many pixels that are occluded and which are later overdrawn. Rending a portion of the object may potentially result in pixels that are not rendered, leaving detectable artifacts in the final image.

Thus, there is a need in the art for improvements in graphics processing for determining how to efficiently render pixels.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In some aspects, the techniques described herein relate to a method of rendering an image including: pre-populating a potentially occluded depth map in a graphics processing unit (GPU) for a current frame based on depth data of a previous frame, a low resolution depth pre-pass, or a rasterizing occlusion geometry; determining, at a rasterization stage at the GPU, that a depth of a portion of a triangle being processed is further than a depth of a corresponding tile in the potentially occluded depth map; and decreasing a fidelity of shading applied to at least the portion of the triangle in comparison to a specified fidelity for the triangle in response to determining that the depth of the portion of the triangle is further than the depth of the corresponding tile.

In some aspects, the techniques described herein relate to a method, wherein pre-populating the potentially occluded depth map for the current frame includes rendering an occlusion geometry into the potentially occluded depth map.

In some aspects, the techniques described herein relate to a method, wherein pre-populating the potentially occluded depth map for the current frame includes reading or projecting a depth buffer from a previous frame.

In some aspects, the techniques described herein relate to a method, wherein projecting the depth buffer from the previous frame includes transforming values of the depth buffer from the previous frame by a difference between a camera for the current frame and a camera for the previous frame.

In some aspects, the techniques described herein relate to a method, wherein the potentially occluded depth map includes a full resolution or reduced resolution copy of values of the depth buffer from the previous frame.

In some aspects, the techniques described herein relate to a method, wherein determining that the depth of the portion the triangle being processed is further than the depth of the corresponding tile in the potentially occluded depth map includes: projecting the triangle into screen space over one or more tiles, each tile including one or more pixels having a depth; and comparing the depth of each pixel or a nearest depth of a set of pixels within a tile to the depth of the corresponding tile in the potentially occluded depth map.

In some aspects, the techniques described herein relate to a method, wherein decreasing the fidelity of shading includes reducing a variable rate shading parameter for the corresponding tile.

In some aspects, the techniques described herein relate to a method, wherein the specified fidelity for the triangle is a variable rate shading parameter.

In some aspects, the techniques described herein relate to a method, wherein decreasing the fidelity of shading includes decreasing a number of texture sampling taps or altering a mip bias to favor a lower resolution mip map.

In some aspects, the techniques described herein relate to a method, wherein decreasing the fidelity of shading includes indicating to a shader that the fidelity of the shading is to be reduced.

In some aspects, the techniques described herein relate to a method, wherein to reduce the fidelity of shading the shader is configured to perform one or more of: reducing a sampling rate of shadows or a frequency of sampling a shadow map; reducing a lighting quality; reducing a number of rays cast; reducing a sampling count for volumetric effects; or reducing an accuracy when stepping through a texture map as a volume searching for an intersection.

In some aspects, the techniques described herein relate to a method, wherein the portion of the triangle includes one or more pixels to be dispatched to a pixel shader.

In some aspects, the techniques described herein relate to a computer device, including: a memory; and a graphics processing unit (GPU) in communication with the memory, wherein the GPU is configured to: determine, at a rasterization stage, that a depth of a portion of a triangle being processed is further than a depth of a corresponding tile in a pre-populated potentially occluded depth map for a current frame; and decrease a fidelity of shading applied to at least a portion of the triangle in comparison to a specified fidelity for the triangle in response to the depth of the triangle being further than the depth of the corresponding tile.

In some aspects, the techniques described herein relate to a computer device, wherein the GPU is configured to render an occlusion geometry an occlusion geometry into the potentially occluded depth map to pre-populate the depth data buffer for the current frame.

In some aspects, the techniques described herein relate to a computer device, wherein the GPU is configured to read or project the pre-populated potentially occluded depth map from a depth data buffer for previous frame.

In some aspects, the techniques described herein relate to a computer device, wherein to determine that the depth of the portion of the triangle being processed is further than a depth of the corresponding tile in the potentially occluded depth map, the GPU is configured to: project the triangle into a screen space over one or more tiles, each tile including one or more pixels having a depth; and compare the depth of each pixel or a nearest depth of a set of pixels within a tile to the depth of the corresponding tile in the potentially occluded depth map.

In some aspects, the techniques described herein relate to a computer device, wherein to decrease the fidelity of shading, the GPU is configured to reduce a variable rate shading parameter for the corresponding tile.

In some aspects, the techniques described herein relate to a computer device, wherein the specified fidelity for the triangle is a variable rate shading parameter.

In some aspects, the techniques described herein relate to a computer device, wherein to decrease the fidelity of shading, the GPU is configured to decrease a number of texture sampling taps or alter a mip bias to favor a lower resolution mip map.

In some aspects, the techniques described herein relate to a computer device, wherein to decrease the fidelity of shading, the GPU is configured to indicate to a shader that the fidelity of the shading is to be reduced.

In some aspects, the techniques described herein relate to a computer device, wherein the shader is configured to perform one or more of: reducing a sampling rate of shadows or a frequency of sampling a shadow map; reducing a lighting quality; reducing a number of rays cast; reducing a sampling count for volumetric effects; or reducing an accuracy when stepping through a texture map as a volume searching for an intersection.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides systems and methods for drawing images on a display with relatively low latency (as compared to current solutions). In graphics intensive computer applications (e.g., video games), the user experience is usually improved by increasing the speed at which an image can be rendered by a particular system. For example, faster rendering may enable higher frame-rates, which the user perceives as smoother movement. As another example, faster rendering may enable use of a higher resolution, more effects, or more content while keeping the frame-rate constant.

Occlusion culling attempts to render graphics faster by removing objects that are occluded. While effective at reducing workload, occlusion culling may be limited in cases where only part of an object is occluded. Even when culling is performed at a per tile or per pixel level, it is possible that pixels that should be displayed are culled, for example, due to resolution differences and/or movement or objects between frames. Such culling may introduce an artifact of an incorrect pixel that may stand out in an image.

Variable rate shading attempts to render graphics faster by designating some portions of an image for lower shading rates. The portions may be selected on a per object, per vertex, or per primitive basis, or per screen space tile via a Coarse Shading Rate Parameter (SRP) Map. While variable rate shading maintains a high quality or fidelity for important parts of the image and speeds up rendering of less important parts of the image, variable rate shading has not provided a solution in the case of partial or full occlusion. Variable rate shading relies on the rasterization stage of the rendering pipeline to dispatch shader threads in accordance with the variable rate for the shading. Conventionally, the rasterization stage does not perform any occlusion testing, so the variable rate shading is performed at the specified rate regardless of whether the pixel may later be overdrawn.

In an aspect, for example, this disclosure provides systems and methods for the graphics processing unit (GPU) to determine at a rasterization stage whether a portion of a triangle (e.g., a pixel or a tile) is likely to be occluded based on a pre-populated depth data buffer. For portions that are likely to be occluded, the rasterization stage may decrease a fidelity of shading applied to a pixel or set of pixels in comparison to a specified fidelity for the triangle. Accordingly, the shading may be performed more quickly because potentially occluded pixels are shaded with lower fidelity, which uses fewer operations. Additionally, in the case that a pixel or set of pixels is indicated as likely to be occluded but ends up being visible, the lower fidelity shading prevents artifacts of unshaded pixels. A human observer is unlikely to notice the fidelity difference of a small number of pixels in a frame, particular on the first frame that these pixels may be visible.

Figure 1:
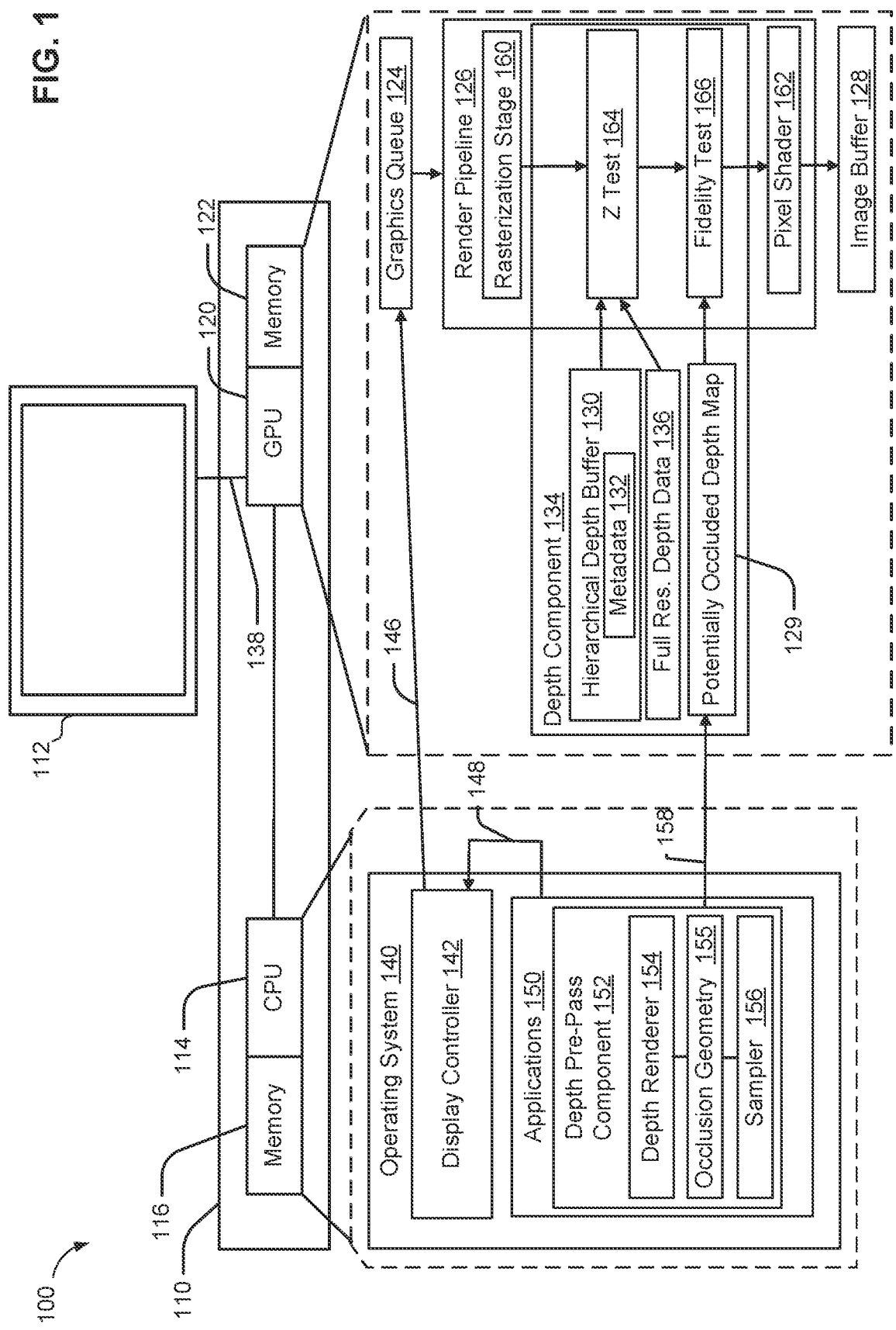
FIG. 1 is a schematic block diagram of an example system for performing shading based on depth testing, in accordance with an implementation of the present disclosure.

Referring now to FIG. 1, an example computer system 100 includes a computer device 110. The computer device 110 may be, for example, any mobile or fixed computer device including but not limited to a desktop or laptop or tablet computer, a cellular telephone, a gaming device, a mixed reality or virtual reality device, a music device, a television, a navigation system, a camera, a personal digital assistant (PDA), a handheld device, any other computer device having wired and/or wireless connection capability with one or more other devices, or any other type of computerized device. The computer device 110 may include a display 112 for displaying a rendered image. The display 112 may be periodically updated at a refresh rate (e.g., 30 Hz-120 Hz). The computer device 110 may provide images for display on the display 112 using a graphics processing unit (GPU) 120 including a graphics queue 124 for receiving commands to render objects in an image, and a render pipeline 126 including a rasterization stage 160, a depth component 134 for providing depth data, and a pixel shader 162 for reducing a fidelity of fragments that are likely occluded.

The computer device 110 may also include a CPU 114 that executes instructions stored in memory 116. For example, the CPU 114 may execute an operating system 140 and one or more applications 150. The operating system 140 may include a display controller 142 to control the GPU 120. For example, the display controller 142 may send rendering commands to the GPU 120. In some cases, the display controller 142 may execute on the CPU 114 to generate an occlusion geometry 155, which may be a full resolution or reduced resolution depth rendering of an image.

Computer device 110 may include a memory 116 and CPU 114 configured to control the operation of computer device 110. Memory 116 may be configured for storing data and/or computer-executable instructions defining and/or associated with an operating system 140 and/or application 150, and CPU 114 may execute operating system 140 and/or applications 150. An example of memory 116 can include, but is not limited to, a type of memory usable by a computer, such as random access memory (RAM), read only memory (ROM), tapes, magnetic discs, optical discs, volatile memory, non-volatile memory, and any combination thereof. Memory 116 may store local versions of applications being executed by CPU 114.

The CPU 114 may include one or more processors for executing instructions. An example of CPU 114 can include, but is not limited to, any processor specially programmed as described herein, including a controller, microcontroller, application specific integrated circuit (ASIC), field programmable gate array (FPGA), system on chip (SoC), or other programmable logic or state machine. The CPU 114 may include other processing components such as an arithmetic logic unit (ALU), registers, and a control unit.

The operating system 140 may include instructions (such as application 150) stored in memory 116 and executable by the CPU 114. The operating system 140 may include a display controller 142 for controlling the GPU 120. For example, the display controller 142 may receive objects 148 from applications 150 and provide commands 146 to the GPU 120 to perform one or more specific graphics processing operations such as rendering source images or performing adjustments.

The GPU 120 may include one or more processors and specialized hardware for image processing. In an implementation, the GPU 120 may be integrated with a CPU 114 on a motherboard of the computer device or may be a discrete chip. The GPU 120 may include a dedicated memory 122. The GPU 120 may be connected to the display 112 via a display interface 138. The GPU 120 may periodically scan out an image from an image buffer 128 to the display 112 via the display interface 138 according to a refresh rate of the display 112.

The GPU 120 may include a graphics queue 124, a render pipeline 126, a depth component 134, and potentially occluded depth map 129. The potentially occluded depth map 129 may include a depth value representing a depth of a closest object for each screen space tile. The graphics queue 124 may receive commands from the display controller 142 for rendering an image. The graphics queue 124 may generally provide the commands to the render pipeline 126. The render pipeline 126 may perform multiple stages of image processing. For example, the render pipeline 126 may include an input-assembler stage, vertex shader stage, hull shader stage, tessellator stage, domain shader stage, geometry shader stage, stream output stage, rasterization stage, pixel-shader stage, and output merger stage.

In an aspect, the depth component 134 may make the rasterization stage 160 and/or the pixel shader 162 occlusion aware to reduce a fidelity of shading for a pixel or a set of pixels (e.g., a fragment) that are likely to be occluded. For example, the depth component 134 may be part of the rasterization stage 160, be after the rasterization stage 160, or be before the pixel shader 162. The depth component 134 may access the potentially occluded depth map 129 representing a depth of a closest object to a camera for each screen space tile to determine whether a fragment being processed is likely to be occluded. In some implementations, the rasterization stage 160 may be referred to as a rasterizer or scan converter. A shader is a piece of code running on a specialized processing unit, also referred to as a shader unit or shader processor, usually executing multiple data threads at once, programmed to generate appropriate levels of color and/or special effects to fragments being rendered. In particular, for example, a pixel shader 162 processes traits (texture values, color, z-depth and alpha value) of a pixel. The pixel shader 162 may be provided by an application 150.

The GPU 120 may include one or more depth buffers for storing depth data related to occlusion. For example, the depth buffers may include a full resolution depth data 136 and/or a hierarchical depth buffer 130, which may also be referred to as a hierarchical z buffer or HZB. The hierarchical depth buffer 130 may also include metadata 132, which may include additional information for groups of pixels. For example, the hierarchical depth buffer 130 and metadata 132 may include information for groups of pixels referred to as tiles. A tile may be a single pixel (1×1), a quad (2×2), or a larger size such as 4×4 or 8×8. The hierarchical depth buffer 130 contains the minimum and/or maximum depth values for the set of pixels contained in that tile. These minimum and maximum depth values may be conservatively quantized, for example using 14-bits or 16-bits, whereas full resolution depth data 136 may be stored using more bits, for example 32-bits. Accordingly, the hierarchical depth buffer 130 may have less precision than the actual GPU 120 calculations. The metadata 132 may also include a clear state bit and other data used to accelerate depth testing or clear operations. The hierarchical depth buffer 130 minimum and maximum depth values may be packed in with other values of metadata 132 to form complete machine words, for example 32 bits of data, or they may be stored separately.

In an aspect, the potentially occluded depth map 129 may be pre-populated. For example, the depth component 134 may pre-populate the potentially occluded depth map 129 based on depth data generated by the CPU 114 or the GPU 120. The potentially occluded depth map 129 may be based on depth data of a previous frame, a low resolution depth pre-pass, or a rasterizing occlusion geometry. For example, the CPU 114 may execute a depth pre-pass component 152 including a depth renderer that generates an occlusion geometry 155. The depth pre-pass component 152 may include a sampler 156 that copies sampled depth values 158 from the occlusion geometry into the potentially occluded depth map 129. In some implementations, the occlusion geometry 155 may be rendered at the same resolution as the potentially occluded depth map 129. In some implementations, the occlusion geometry may be directly rendered into the potentially occluded depth map 129. As another example, the depth component 134 may read or project a depth buffer from a previous frame (e.g., the hierarchical depth buffer 130 or the full resolution depth data 136) into the potentially occluded depth map 129 for a current frame. Projecting the depth buffer from the previous frame may include transforming values of the depth buffer from the previous frame by a difference between a camera for the current frame and a camera for the previous frame. The potentially occluded depth map may include a full resolution or reduced resolution copy or projection of values of the depth buffer from the previous frame.

In an example, display interface 138 can be communicatively coupled with the GPU 120 and/or memory 122 for communicating with the display 112. A display interface, as referred to herein, may also include various types of ports, including high definition multimedia interface (HDMI) ports, display serial interface (DSI) ports, mobile industry processor interface (MIPI) DSI ports, universal serial bus (USB) ports, Firewire ports, or other embedded or external wired or wireless display ports that can allow communications between computer device 110 and display 112.

The applications 150 may include graphical components that involve rendering an image to the display 112. For example, the applications 150 may include video games that render a series of images to the display 112 at a frame-rate. Generally, application developers may seek to improve the user experience by maximizing frame-rate, resolution, color depth, or other image properties, or letting the user select such properties. One or more applications 150 may include a depth pre-pass component 152 for pre-populating the potentially occluded depth map. The depth pre-pass component 152 may include a depth renderer 154 for rendering an occlusion geometry 155 for pre-populating the potentially occluded depth map 129 based on sampled depth values 158 of the occlusion geometry 155.

The depth renderer 154 may include instructions to perform a depth-only rendering of a scene to generate an occlusion geometry 155. The occlusion geometry 155 may have the same resolution or a lower resolution than the final full resolution image. For example, the lower resolution may be one-fourth, one-eighth, or less of the full resolution. The depth renderer 154 may instruct either the CPU 114 or the GPU 120 to perform the depth-only rendering. In some implementations, because the depth-only rendering may omit some processing intensive pixel level operations, either the CPU 114 or the GPU 120 may be able to quickly perform the depth-only rendering. An application designer may select whether the CPU 114 or the GPU 120 performs the depth-only rendering based on the particular needs of the application 150 and other work being performed on each of the CPU 114 or the GPU 120. The occlusion geometry 155 generated by the depth-only rendering may include a depth value for each pixel of screen space in the depth-only rendering. The depth value 158 may be the depth of the closest object/surface rendered. When the resolution of the depth data is less than the full resolution, the depth value 158 may be the furthest depth value from the set of corresponding depth values from the higher resolution depth data. A greater depth value 158 may indicate that the object is further away from the camera or screen, or if the Reverse-Z algorithm is being employed by the application, a smaller depth value 158 may indicate that the object is further away from the camera. The sampler 156 may sample depth values 158 of the occlusion geometry 155 for pre-populating the potentially occluded depth map 129. In some implementations, depth renderer 154 may directly render the occlusion geometry 155 into the potentially occluded depth map 129.

In an aspect, the depth component 134 may operate at or between the rasterization stage 160 and the pixel shader 162 to reduce processing of occluded pixels. For example, the rasterizer stage 160 may output pixels or groups of pixels. The depth component 134 may perform a Z test 164 to compare a depth of a pixel or group of pixels to a depth buffer for the current frame (e.g., hierarchical depth buffer 130 or full resolution depth data 136). The depth buffer for the current frame, however, does not include a depth for objects that have not yet been drawn for the current frame. Accordingly, even if a portion of the triangle passes the Z test 164, the portion of the triangle may later be overdrawn. In an aspect, the depth component 134 may attempt to reduce a fidelity of pixels that are likely to be overdrawn based on the potentially occluded depth map 129. For example, the depth component 134 may be configured to perform a fidelity test 166 to compare a depth of the pixel or group of pixels being processed to a depth stored in the potentially occluded depth map 129. If the portion of the pixel or group of pixels being processed is further than the corresponding tile of the potentially occluded depth map 129, the depth component 134 may reduce the fidelity of the portion of the triangle when providing the portion of the triangle to the pixel shader 162.

Figure 2:
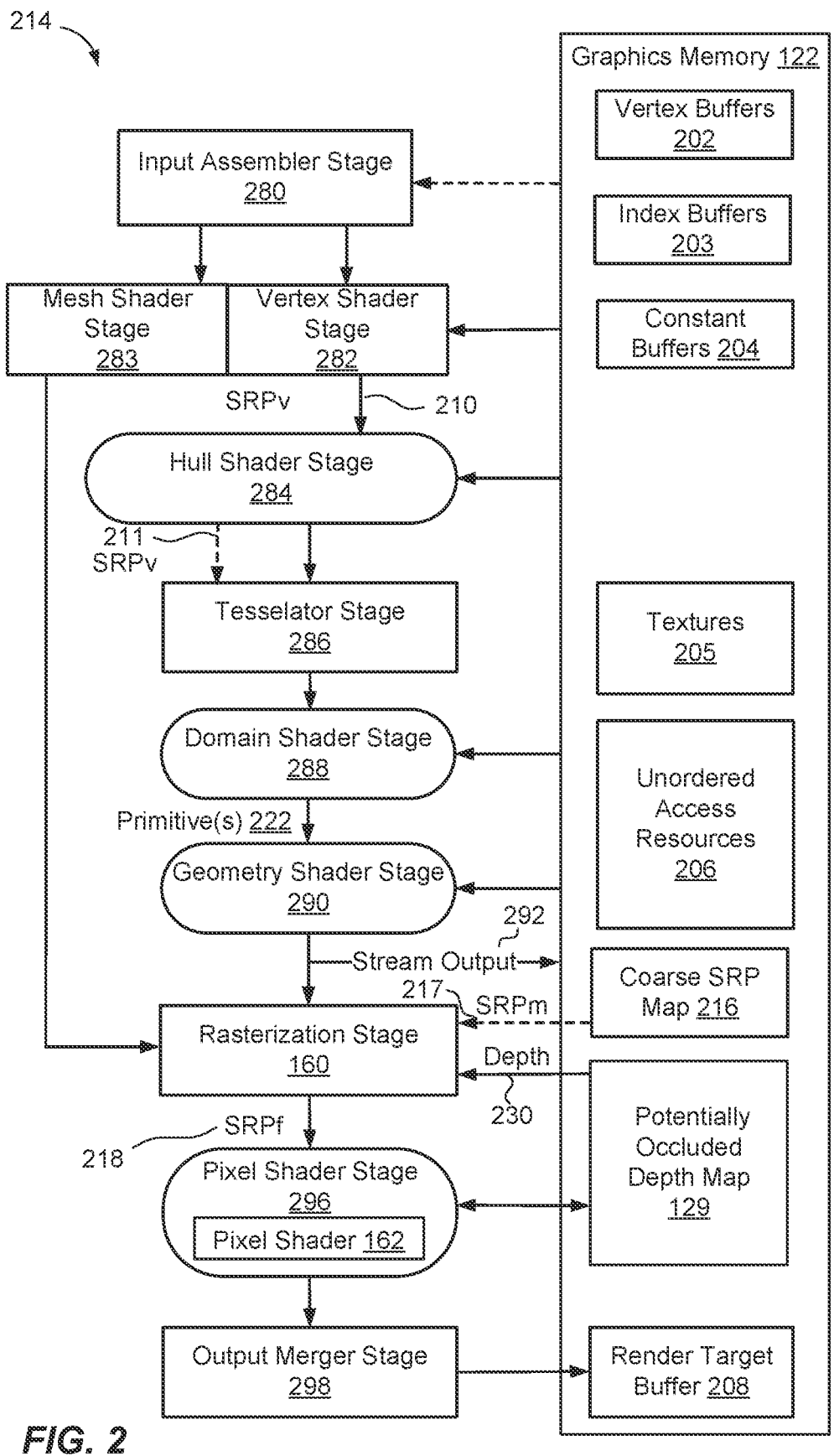
FIG. 2 is a diagram of a GPU configured to implement the stages of an example logical graphics pipeline that may perform reduced fidelity shading of potentially occluded pixels, in accordance with an implementation of the present disclosure.

Referring to FIG. 2, for instance, in one example, GPU 120 can be configured to implement the stages of an example logical graphics pipeline 214 that may perform reduced fidelity shading of occluded pixels as described herein. In an aspect, one or more of the various stages may be programmable, for instance, to utilize or modify sampling rate parameter (SRP) values. An SRP may be a parameter for variable rate shading and may alternatively be referred to as a shading rate parameter. Moreover, in an aspect, common shader cores may be represented by the rounded rectangular blocks. This programmability makes graphics pipeline 214 extremely flexible and adaptable. The purpose of each of the stages is now described in brief below, and additional functionality will be further described with respect to subsequent figures.

The input assembler stage 280 supplies data (triangles, lines, points, and indexes) to the pipeline.

The vertex shader stage 282 processes vertices, typically performing operations such as transformations, skinning, and lighting. Vertex shader stage 82 takes a single input vertex and produces a single output vertex. Also, as indicated at 210, vertex shader stage 282 optionally outputs an SRPv, that is either calculated or looked up. In some implementations, the logical graphics pipeline 214 may include a mesh shader stage 283. An application may have the choice of using either a vertex shader stage 282 or a mesh shader stage 283. A mesh shader may perform the same work as a vertex shader, but additionally a mesh shader can do processing of triangles, including culling, or producing any per primitive data, including shading rate. It should be noted that, in some implementations, such as when using higher-order surfaces, the SRPv comes from a hull shader stage 284.

The hull shader stage 284, a tessellator stage 286, and a domain-shader 288 stage comprise the tessellation stages. The tessellation stages convert higher-order surfaces to triangles, e.g., primitives, as indicated at 222, for rendering within logical graphics pipeline 214. Optionally, as indicated at 211, hull shader stage 284 can generate the SRPv value for each vertex of each generated primitive (e.g., triangle).

The geometry shader stage 290 optionally (e.g., this stage can be bypassed) processes entire primitives 222. Its input may be a full primitive 222 (which is three vertices for a triangle, two vertices for a line, or a single vertex for a point), a quad, or a rectangle. In addition, each primitive can also include the vertex data for any edge-adjacent primitives. This could include at most an additional three vertices for a triangle or an additional two vertices for a line. The geometry shader stage 290 also supports limited geometry amplification and de-amplification. Given an input primitive 222, the geometry shader can discard the primitive, or emit one or more new primitives. Each primitive emitted will output an SRPv for each vertex.

The stream-output stage 292 streams primitive data from graphics pipeline 214 to graphics memory 122 on its way to the rasterization stage 160. Data can be streamed out and/or passed into a rasterization stage 160. Data streamed out to graphics memory 122 can be recirculated back into graphics pipeline 214 as input data or read-back from the CPU 114 (FIG. 1). This stage may optionally stream out SRPv values to be used on a subsequent rendering pass.

The rasterization stage 160 clips primitives, prepares primitives for a pixel shader stage 296, and determines how to invoke pixel shaders 162. Further, as generally indicated at 218, the rasterization stage 160 performs coarse scan conversions and determines a per-fragment variable shading rate parameter value (SRPf) (e.g., where the fragment may be a tile, a sub-tile, a quad, a pixel, or a sub-pixel region). Additionally, the rasterization stage 160 performs fine scan conversions and determines pixel sample positions covered by the fragments.

Further, as indicated at 217, the rasterization stage 160 can also obtain lookup values (SRPm) from coarse SRP map 216. The lookup values correspond to shading rates specified for a larger area, such as a screen space of the image or the entire image. Additionally, the rasterization stage 160 may compute SRPf as a function of SRPv and the lookup values (SRPm), as described in further detail below.

The pixel shader stage 296 receives interpolated data for primitives and/or fragments and generates per-pixel data, such as color and sample coverage masks. The pixel shader stage 296 may operate on one or more pixels at once, using one thread for one or more pixels. The sets of pixel shader threads may be executed in waves with typically 8, 16, 32, or 64 pixels per wave. In an aspect, the pixel shader stage 296 may include a pixel shader 162 that is configured to perform pixel shading with reduced fidelity based on an indication from the rasterization stage 160 or alternatively, the pixel shader 162 may load the potentially occluded depth map 129 and perform a comparison operation. In some implementations, the rasterization stage 160 may group pixels that are designated for reduced fidelity into the same wave. All of the potentially occluded pixels in a wave may take the same code path in the pixel shader. Pixels that are not potentially occluded may also be grouped into waves and all take a different code path in the pixel shader.

The output merger stage 298 combines various types of pipeline output data (pixel shader values, depth and stencil information, and coverage masks) with the contents of the render target and depth/stencil buffers to generate the final result of graphics pipeline 14. The output merger stage 298 may result in overdraw of pixels based on the depth.

Also, as discussed above and as illustrated in FIG. 2, graphics pipeline 214 may operate in conjunction with graphics memory 122 for exchanging and storing data. For example, in an aspect, graphics memory 122 includes one or more vertex buffers 202 that each contains the vertex data used to define geometry of an image. Vertex data includes position coordinates, color data, texture coordinate data, normal data, and so on. The simplest example of vertex buffer 202 is one that only contains position data. More often, vertex buffer 202 contains all the data needed to fully specify 3D vertices. An example of this could be vertex buffer 202 that contains per-vertex position, normal and texture coordinates. This data is usually organized as sets of per-vertex elements.

Further, in an aspect, graphics memory 122 may include one or more index buffers 203, which contain integer offsets into vertex buffers 202 and are used to render primitives 222 more efficiently. Each index buffer 203 contains a sequential set of indices; each index is used to identify a vertex in a vertex buffer 202.

Also, in an aspect, graphics memory 122 may include one or more constant buffers 204 that allow an efficient supply of shader constants, shader data, and/or any other shader resources to graphics pipeline 214. Further, constant buffer 204 can be used to store the results of the stream-output stage 292. Moreover, graphics memory 122 may include one or more texture buffers or textures data 205, such as bitmaps of pixel colors that give an object the appearance of texture.

Additionally, in an aspect, graphics memory 122 may include one or more unordered access resources 206 (which includes buffers, textures, and texture arrays—without multisampling). Unordered access resources 206 allow temporally unordered read/write access from multiple threads. This means that this resource type can be read/written simultaneously by multiple threads without generating memory conflicts through the use of certain defined functions.

Moreover, in an aspect, graphics memory 122 may include one or more render target buffers 208, which contain the rendered target or drawing of each pixel of an image produced by graphics pipeline 214.

As described in more detail below with respect to the method of operation of graphics pipeline 214 according to the described aspects, the rasterization stage 160 may consider likely occlusion when dispatching threads to the pixel shader stage 296. The graphics memory 122 may include the potentially occluded depth map 129. The rasterization stage 160 may access the potentially occluded depth map 129 and compare the depth data to a portion of a triangle being processed (e.g., a fragment or tile). For example, the rasterization stage 160 may compare a depth of the fragment with the depth 230 of a corresponding tile in the potentially occluded depth map 129 to determine whether the fragment is likely occluded. A fragment is likely occluded when the depth of the fragment is further from the camera than the depth 230 of a corresponding tile in the potentially occluded depth map 129. In implementations where the fragment includes multiple pixels, there may be one or more comparisons made with the potentially occluded depth map 129, or a single comparison may be made using the nearest depth of one or more pixels with the potentially occluded depth map 129. The rasterization stage 160 may decrease a fidelity of shading applied to the fragment if the fragment is likely occluded.

In some implementations, the rasterization stage 160 may reduce a SRP for the fragment (e.g., SRPf) based on likely occlusion. For instance, as noted above, mesh shader stage 283 and/or vertex shader stage 282 are configured to determine an SRP value per vertex (SRPv) 210 for each vertex of each primitive 222 of the image. For example, SRPv value 210 may be determined for each vertex based on one or more SRP values per object (SRPo), SRP values per primitive (SRPp), or SRPp values supplied by application 150 (FIG. 1), e.g., at 212, and/or determined by mesh shader stage 283, e.g., at 215. The rasterization stage 160 may receive SRPm values 217 from the coarse SRP map 216. Further, rasterization stage 160 may interpolate and quantize respective SRPv values 210 for different sub-tiles or fragments of each primitive 222 to define SRP values per fragment (SRPf) 218. The rasterization stage 160 may reduce the SRPf 218 for a portion of a triangle if the depth of the portion of the triangle is further than a depth in the potentially occluded depth map 129. That is, the rasterization stage 160 may set the SRPf 218 for the portion of the triangle (e.g., the fragment) to a lower value than otherwise would be set (e.g., based on the SRPv and SRPm values). For example, the rasterization stage 160 may set the SRPf 218 to a minimum value (e.g., ¼) or to a coarser value than supplied (e.g., full rate becomes half rate, or half rate becomes quarter rate, etc.).

In some implementations, the rasterization stage 160 may reduce another shading parameter such as a number of texture sampling taps or a mip map bias. For example, the rasterization stage 160 may decrease the number of texture sampling taps for one or more textures whose values contribute to a pixel when dispatching a pixel shader thread. As another example, the rasterization stage 160 may alter a mip bias for one or more textures to favor a lower resolution mip map.

In some implementations, the rasterization stage 160 may indicate to a shader that the fidelity of shading is to be reduced. For example, when dispatching a pixel shader thread, the rasterization stage 160 may indicate a specific level of fidelity or that reduced fidelity is to be used by the pixel shader 162. Because shaders may be programmed for an individual application, the pixel shader 162 may have a large degree of flexibility in how to implement reduced fidelity. In some implementations, the pixel shader may rely on parameters (e.g., SRP) provided by the rasterization stage 160 to perform the reduced fidelity shading. In some implementations, the pixel shader 162 may be programmed to perform zero or more actions based on the indication. For example, the pixel shader 162 may reduce a sampling rate of shadows or a frequency of sampling a shadow map. The rasterization stage 160 may specify the sampling rate of shadows or the frequency of sampling, or the rasterization stage my indicate reduced fidelity and the pixel shader 162 may select a lower or minimum rate or frequency. As another example, the pixel shader may reduce a lighting quality or apply global illumination. As another example, the pixel shader 162 may reduce a number of rays cast. For instance, reducing the number of rays cast may include generating an occlusion term, a soft shadow, an area light shadow, or sampling reflected radiance. As another example, the pixel shader 162 may reduce a sampling count for volumetric effects such as fog or atmospheric scattering. As yet another example, the pixel shader 162 may reduce an accuracy when stepping through a texture map as a volume searching for an intersection. The reduced fidelity may include any action that reduces a runtime of the pixel shader 162.

Figure 3:
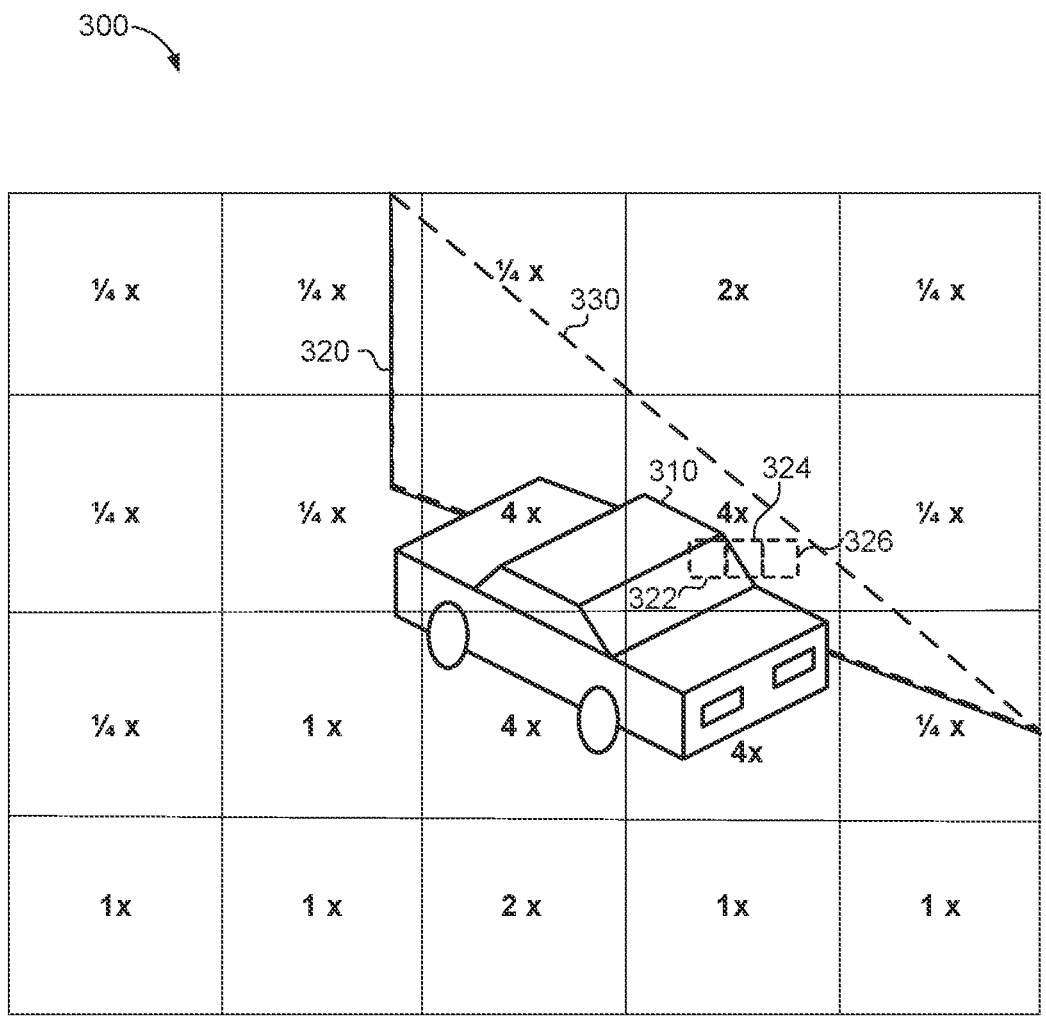
FIG. 3 is an example image including a first object that is partially occluded by a second object, in accordance with an implementation of the present disclosure.

Referring now to a FIG. 3, for instance, an example image 300 generated by graphics pipeline 214 includes a vehicle 310 and a building 320. The building may be drawn as one or more large triangles 330. The vehicle 310 may be closer to the camera and occlude some portions of the building 320. Variable rate shading alone may result in high fidelity shading being performed on occluded pixels.

For some implementations of variable rate shading, different shading rates may be specified for different regions of an image. In some implementations, the shading rates may be specified based on anti-aliasing (AA) that indicates a number of coverage samples evaluated per pixel by rasterization stage 160 and included in the coverage mask. For example, shading rates such as, but not limited to, ¼×AA, 1×AA, 2×AA, 4×AA may be specified for a region depending on a level of detail of different portions or regions of image 300. For example, the shading rates may be represented by the course SRP map 216. In some implementations, a shading rate may be specified per object, per primitive (e.g., triangle 330), or per vertex. In any case, some portions of the building 320 may be assigned a relatively high shading rate in comparison to other parts of the image. For example, the portion of the building 320 that is behind the vehicle 310 may be in a high level of detail region of the image (e.g., because the vehicle is important) and/or the building itself may be associated with a high shading rate. However, because the portions of the wall are occluded by the vehicle 310, the high shading rate will result in wasted effort or time because the rendered pixels will be overdrawn.

In an aspect, when the rasterization stage 160 is dispatching threads for the triangles 330 corresponding to the building 320, the rasterization stage 160 will compare the depth of each fragment being processed with the potentially occluded depth map 129 to determine whether to reduce a fidelity for the fragment. For example, the fragment may be a single pixel or a group of pixels. For instance, a triangle may include fragments 322, 324, and 326. The rasterization stage 160 may process each fragment 322, 324, 326 and dispatch a corresponding pixel shader thread or multiple threads.

In the illustrated example, fragment 322 is completely occluded by the vehicle 310. Accordingly, the rasterization stage 160 may reduce a fidelity for the fragment 322. For example, although the course SRP map 216 indicates an SRP of 4×AA for the region including the fragment 322, the rasterization stage 160 may set a minimum SRP (e.g., ¼×AA). The rasterization stage 160 may similarly reduce other SRP values. The rasterization stage 160 may alternatively or additionally reduce the fidelity based on texture sampling or by indicating lower fidelity to the pixel shader.

As illustrated, the fragment 324 is partially occluded by the vehicle 310. That is, depending on the resolution of the potentially occluded depth map 129 and the size of the fragment 324, a comparison of the depth of the fragment 324 to the depth of the corresponding tile in the potentially occluded depth map 129 may indicate that the fragment 324 is further or closer than the potentially occluded depth map 129. For instance, if the nearest pixel of the building 320 is compared to a depth corresponding to part of the vehicle 310, the whole fragment 324 may be considered further away and potentially occluded. In some implementations, if the potentially occluded depth map 129 is based on a previous frame, it is also possible that the vehicle 310 has moved, thereby changing whether the fragment 324 is occluded. If the fragment (or a subset of pixels) is not actually occluded and the fidelity of the fragment 324 is reduced, the general properties of the shading will be correct and the reduced fidelity may be difficult to detect. If the fragment (or a subset of pixels) is actually occluded and the fidelity of the fragment 324 is not reduced, the additional processing for the small number of fragments that are incorrectly determined is still less than performing high fidelity processing on all occluded fragments. Accordingly, reducing fidelity based on potential occlusion may provide desired or acceptable results for borderline or ambiguous fragments.

As illustrated, the fragment 326 is not occluded by the vehicle 310. Accordingly, the rasterization stage 160 may not reduce the fidelity of the fragment 326, thereby providing high fidelity shading as indicated.

Figure 4:
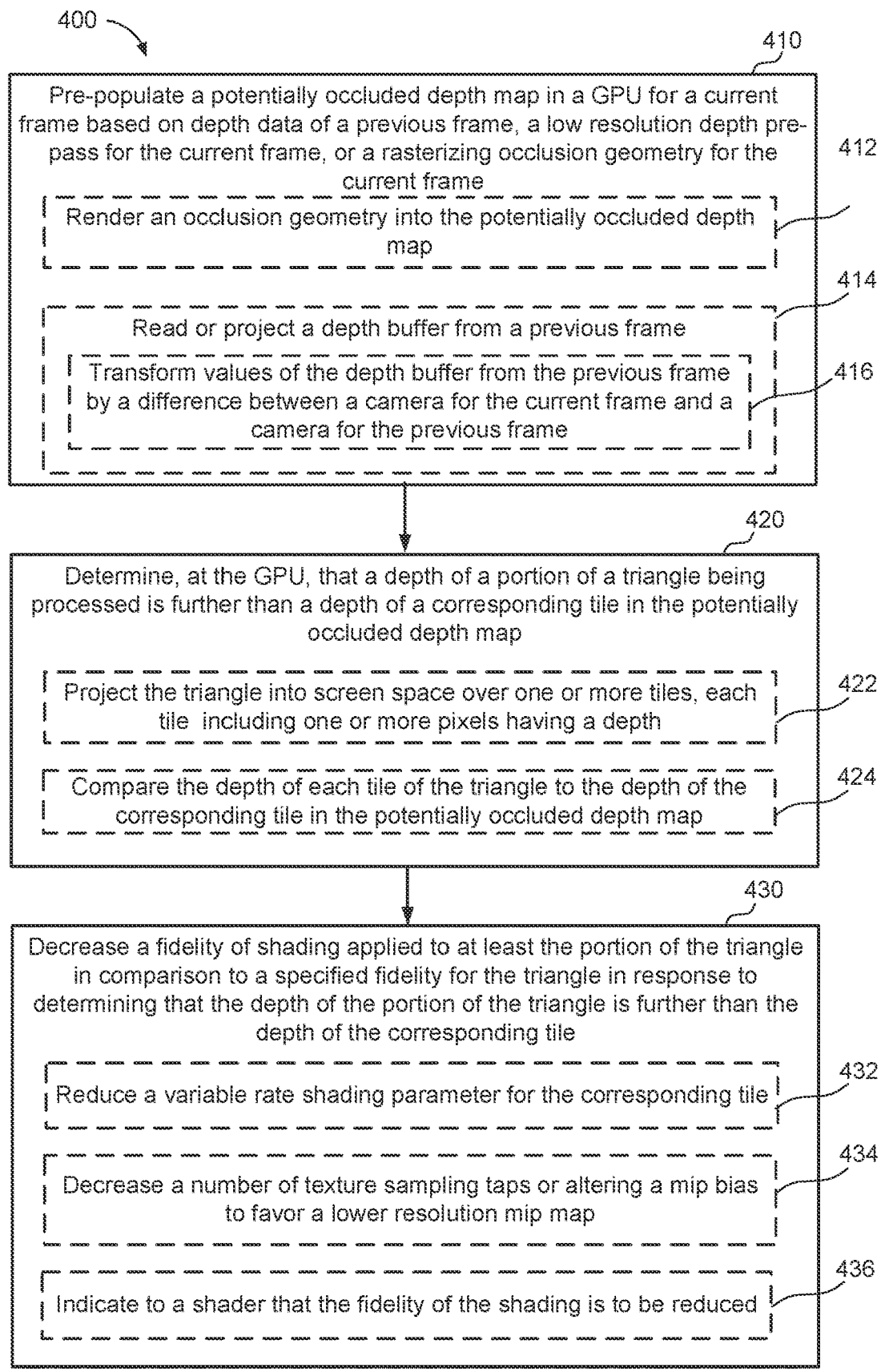
FIG. 4 is flowchart of an example method of drawing an image by reducing a fidelity of shading for potentially occluded pixels, in accordance with an implementation of the present disclosure.

Referring now to FIG. 4, an example method 400 provides for the computer device 110 to render a potentially occluded portion of a triangle with reduced fidelity. For example, method 400 may be performed by performing graphics processing using a GPU 120. In some implementations, some blocks of method 400 may performed by an application 150 executing on a CPU 114.

In block 410, the method 400 may include pre-populating a potentially occluded depth map based on depth data of a previous frame, a low resolution depth pre-pass for the current frame, or a rasterizing occlusion geometry for the current frame. For instance, the GPU 120 or the CPU 114 may pre-populate potentially occluded depth map 129 based on depth data of a previous frame, a low resolution depth pre-pass for the current frame, or a rasterizing occlusion geometry for the current frame. In some implementations, at sub-block 412, the block 410 may include rendering an occlusion geometry into the potentially occluded depth map. For example, application 150 may execute the depth renderer 154 to render the occlusion geometry 155 into the potentially occluded depth map 129. The depth renderer 154 may render the occlusion geometry 155 either on the CPU 114 or the GPU 120. As another example, at sub-block 414, the block 410 may optionally include reading or projecting a depth buffer from a previous frame. For example, the GPU 120 may read or project the hierarchical depth buffer 130 from a previous frame into the potentially occluded depth map 129 for the current frame. At sub-block 416, the sub-block 414 may include transforming values of the depth buffer from the previous frame by a difference between a camera for the current frame and a camera for the previous frame. For example, the GPU 120 may project the hierarchical depth buffer 130 by transforming values of the depth buffer by a difference between a camera for the current frame and a camera for the previous frame.

In some implementations, the potentially occluded depth map may be at a reduced resolution such as a fraction of the full resolution. In one implementation, the reduced resolution may be one-eighth of the full resolution. For example a 4 k frame (3840×2160 pixels) may use a reduced resolution of 270p (480×270 pixels). One pixel of the occlusion geometry 155 may correspond to one pixel on the potentially occluded depth map, or multiple pixels in the occlusion geometry 155 may correspond to one pixel in the potentially occluded depth map, in which case the nearest depth value is selected for each corresponding pixel. Other resolutions may also be selected, based on, for example, the available processing resources of the CPU 114 or the GPU 120. In some implementations, the potentially occluded depth map includes a full or reduced resolution copy of values from the previous frame.

At block 420, the method 400 may include determining, at a rasterization stage at the GPU, that a depth of a portion of a triangle being processed is further than a depth of a corresponding tile in the potentially occluded depth map. For instance, the rasterization stage 160 may determine that a depth of a portion of a triangle 330 being processed is further than a depth of a corresponding tile in the potentially occluded depth map 129. In some implementations, at sub-block 422, the block 420 may optionally include projecting the triangle into screen space over one or more tiles, each tile including one or more pixels having a depth. For example, the rasterization stage 160 may project the triangle 330 into screen space. The triangle 330 includes, for example, fragments 322, 324, 326, which may be projected as tiles including one or more pixels. At sub-block 424, the block 420 may optionally include comparing the depth of each tile of the triangle to the depth of the corresponding tile in the potentially occluded depth map. For example, the rasterization stage 160 may compare the depth of each tile (e.g., corresponding to fragments 322, 324, 326) of the triangle 330 to the depth of the corresponding tile in the potentially occluded depth map 129.

At block 430, the method 400 may include decreasing a fidelity of shading applied to at least the portion of the triangle in comparison to a specified fidelity for the triangle in response to determining that the depth of the portion of the triangle is further than the depth of the corresponding tile. For instance, in an implementation, the rasterization stage 160 may decrease the fidelity of shading applied to at least the portion of the triangle (e.g., fragments 322, 324, 326) in comparison to a specified fidelity for the triangle in response to block 420. In some implementations, in block 432, the block 430 may optionally include reducing a variable rate shading parameter (e.g., a SRP) for the corresponding tile. In some implementations, in block 434, the block 430 may optionally include decreasing a number of texture sampling taps or altering a mip bias to favor a lower resolution mip map. In some implementations, in block 436, the block 430 may optionally include indicating to a shader (e.g., pixel shader 162) that the fidelity of the shading is to be reduced. For example, the rasterization stage 160 may indicate that shading is to be reduced or specify a reduced level of shading when dispatching pixel shader threads.

Figure 5:
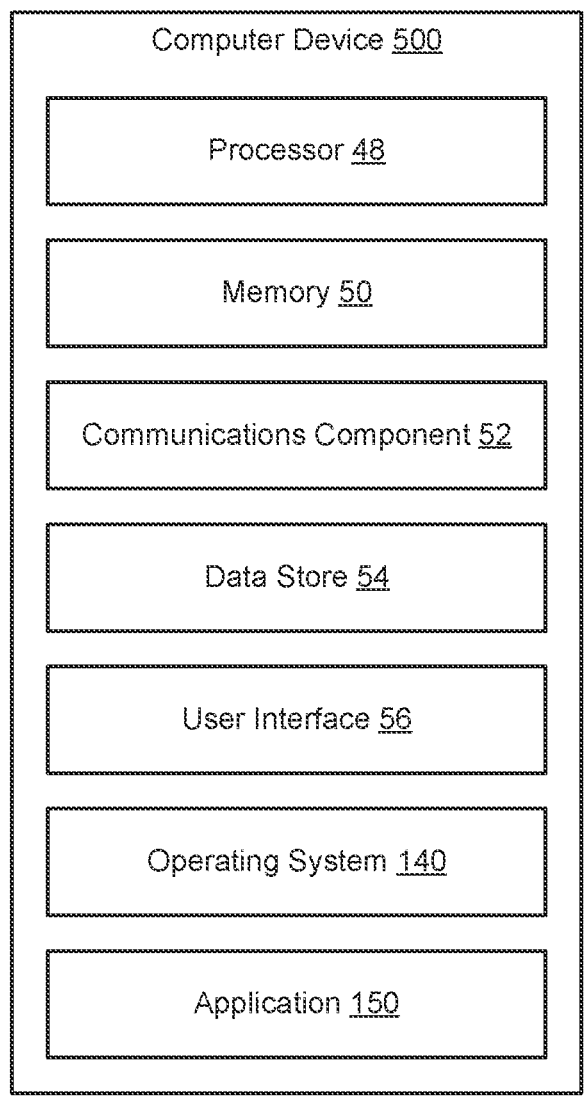
FIG. 5 is a schematic block diagram of an example computer device in accordance with an implementation of the present disclosure.

Referring now to FIG. 5, illustrated is an example computer device 500 in accordance with an implementation, including additional component details as compared to the computer device 110 of FIG. 1. In one example, computer device 500 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 may include CPU 114 and/or GPU 120. In an example, computer device 500 may include memory 50 for storing instructions executable by the processor 48 for carrying out the functions described herein. In an implementation, for example, memory 50 may include memory 116 and/or memory 122.

Further, computer device 500 may include a communications component 52 that provides for establishing and maintaining communications with one or more parties utilizing hardware, software, and services as described herein. Communications component 52 may carry communications between components on computer device 110, as well as between computer device 110 and external devices, such as devices located across a communications network and/or devices serially or locally connected to computer device 110. For example, communications component 52 may include one or more buses, and may further include transmit chain components and receive chain components associated with a transmitter and receiver, respectively, operable for interfacing with external devices.

Additionally, computer device 500 may include a data store 54, which can be any suitable combination of hardware and/or software, that provides for mass storage of information, databases, and programs employed in connection with implementations described herein. For example, data store 54 may be a data repository for operating system 140 (FIG. 1) and/or applications 150 (FIG. 1).

Computer device 500 may also include a user interface component 56 operable to receive inputs from a user of computer device 500 and further operable to generate outputs for presentation to the user. User interface component 56 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 may include one or more output devices, including but not limited to a display (e.g., display 112), a speaker, a haptic feedback mechanism, a printer, any other mechanism capable of presenting an output to a user, or any combination thereof.

In an implementation, user interface component 56 may transmit and/or receive messages corresponding to the operation of operating system 140 and/or application 150. In addition, processor 48 executes operating system 140 and/or application 150, and memory 50 or data store 54 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
a memory; and
a graphics processing unit (GPU) in communication with the memory, wherein the GPU is configured to:
determine that a depth of a portion of a triangle being processed is further than a depth of a corresponding tile in a pre-populated depth data buffer for a current frame; and
shade the portion of the triangle with a decreased fidelity of shading applied to at least a portion of the triangle in comparison to a specified fidelity for the triangle in response to the depth of the triangle being further than the depth of the corresponding tile.

2. The computer device of claim 1, wherein the GPU is configured to render an occlusion geometry into a potentially occluded depth map to pre-populate the depth data buffer for the current frame.

3. The computer device of claim 1, wherein the GPU is configured to read or project the pre-populated depth data buffer from depth values of a previous frame.

4. The computer device of claim 1, wherein to determine that the depth of the portion of the triangle being processed is further than a depth of the corresponding tile in the pre-populated depth data buffer, the GPU is configured to:
project the triangle into a screen space over one or more tiles, each tile including one or more pixels having a depth; and
compare the depth of each pixel or a nearest depth of a set of pixels within a tile to the depth of the corresponding tile in the pre-populated depth data buffer.

5. The computer device of claim 1, wherein to decrease the fidelity of shading, the GPU is configured to reduce a variable rate shading parameter for the corresponding tile.

6. The computer device of claim 1, wherein the specified fidelity for the triangle is a variable rate shading parameter.

7. The computer device of claim 1, wherein to decrease the fidelity of shading, the GPU is configured to decrease a number of texture sampling taps or alter a mip bias to favor a lower resolution mip map.

8. The computer device of claim 1, wherein to decrease the fidelity of shading, the GPU is configured to indicate to a shader that the fidelity of the shading is to be reduced.

9. The computer device of claim 8, wherein the shader is configured to perform one or more of:
reducing a sampling rate of shadows or a frequency of sampling a shadow map;
reducing a lighting quality;
reducing a number of rays cast;
reducing a sampling count for volumetric effects; or
reducing an accuracy when stepping through a texture map as a volume searching for an intersection.

10. A method of rendering an image comprising:
pre-populating a potentially occluded depth map in a graphics processing unit (GPU) for a current frame based on depth data of a previous frame, a low resolution depth pre-pass for the current frame, or a rasterizing occlusion geometry for the current frame;
determining, at the GPU, that a depth of a portion of a triangle being processed is further than a depth of a corresponding tile in the potentially occluded depth map; and
shading the portion of the triangle with a decreased fidelity of shading applied to at least the portion of the triangle in comparison to a specified fidelity for the triangle in response to determining that the depth of the portion of the triangle is further than the depth of the corresponding tile.

11. The method of claim 10, wherein pre-populating the potentially occluded depth map for the current frame comprises rendering an occlusion geometry into the potentially occluded depth map.

12. The method of claim 10, wherein pre-populating the potentially occluded depth map for the current frame comprises reading or projecting a depth buffer from a previous frame.

13. The method of claim 12, wherein projecting the depth buffer from the previous frame comprises transforming values of the depth buffer from the previous frame by a difference between a camera for the current frame and a camera for the previous frame.

14. The method of claim 12, wherein the potentially occluded depth map includes a full resolution or reduced resolution copy of values of depth values from the previous frame.

15. The method of claim 10, wherein determining that the depth of the portion the triangle being processed is further than the depth of the corresponding tile in the potentially occluded depth map comprises:
projecting the triangle into screen space over one or more tiles, each tile including one or more pixels having a depth; and
comparing the depth of each pixel or a nearest depth of a set of pixels within a tile to the depth of the corresponding tile in the potentially occluded depth map.

16. The method of claim 10, wherein decreasing the fidelity of shading comprises reducing a variable rate shading parameter for the corresponding tile.

17. The method of claim 10, wherein the specified fidelity for the triangle is a variable rate shading parameter.

18. The method of claim 10, wherein decreasing the fidelity of shading comprises decreasing a number of texture sampling taps or altering a mip bias to favor a lower resolution mip map.

19. The method of claim 10, wherein decreasing the fidelity of shading comprises indicating to a shader that the fidelity of the shading is to be reduced.

20. The method of claim 19, wherein to reduce the fidelity of shading the shader is configured to perform one or more of:
reducing a sampling rate of shadows or a frequency of sampling a shadow map;
reducing a lighting quality;
reducing a number of rays cast;
reducing a sampling count for volumetric effects; or
reducing an accuracy when stepping through a texture map as a volume searching for an intersection.

21. The method of claim 10, wherein the portion of the triangle includes one or more pixels to be dispatched to a pixel shader.

* * * * *